United States Patent
Torabi et al.

(10) Patent No.: US 7,894,288 B2
(45) Date of Patent: Feb. 22, 2011

(54) PARALLEL DATA STORAGE SYSTEM

(75) Inventors: Hooshmand Torabi, Irvine, CA (US); Chak-Fai Cheng, Huntington Beach, CA (US); Nader Salessi, Laguna Niguel, CA (US); Hosein Gazeri, Irvine, CA (US)

(73) Assignee: STEC, Inc., Santa Ana, CA (US)

( * ) Notice: Subject to any disclaimer, the term of this patent is extended or adjusted under 35 U.S.C. 154(b) by 0 days.

(21) Appl. No.: 12/574,235

(22) Filed: Oct. 6, 2009

(65) Prior Publication Data

US 2010/0023714 A1 Jan. 28, 2010

Related U.S. Application Data

(63) Continuation of application No. 12/122,637, filed on May 16, 2008, now Pat. No. 7,619,941, which is a continuation of application No. 11/358,043, filed on Feb. 22, 2006, now Pat. No. 7,376,034.

(60) Provisional application No. 60/750,866, filed on Dec. 15, 2005.

(51) Int. Cl.
*G11C 7/00* (2006.01)

(52) U.S. Cl. ............. 365/220; 365/189.05; 365/230.06; 365/230.03

(58) Field of Classification Search ................. 365/200, 365/189.05, 230.06, 230.03
See application file for complete search history.

(56) References Cited

U.S. PATENT DOCUMENTS

| | | | |
|---|---|---|---|
| 4,928,246 A | 5/1990 | Crawley et al. | |
| 6,282,145 B1 | 8/2001 | Tran et al. | |
| 7,173,859 B2 * | 2/2007 | Hemink | 365/185.28 |
| 7,372,744 B2 * | 5/2008 | Shiga et al. | 365/189.05 |
| 7,376,034 B2 | 5/2008 | Torabi et al. | |
| 2005/0141312 A1 | 6/2005 | Sinclair et al. | |
| 2006/0221720 A1 * | 10/2006 | Reuter | 365/189.05 |

\* cited by examiner

*Primary Examiner*—Tuan T. Nguyen
(74) *Attorney, Agent, or Firm*—McDermott Will & Emery LLP

(57) ABSTRACT

A parallel data storage system for storing data received from, or retrieving data to, a host system using multiple data storage devices. The system includes an interface for communicating with the host system and a buffer configured to store data sectors received from the host system via the interface. A switch is used to selectively connect the interface and the data storage devices to the buffer to facilitate the transfer of data into and out of the buffer. The data sectors are transferred by segmenting each sector into multiple smaller data cells and distributing these data cells among the data storage devices using an arbitrated distribution method.

20 Claims, 8 Drawing Sheets

US 7,894,288 B2

PARALLEL DATA STORAGE SYSTEM

This application is a continuation of U.S. application Ser. No. 12/122,637, filed May 16, 2008, which is a continuation of U.S. application Ser. No. 11/358,043, now U.S. Pat. No. 7,376,034, filed Feb. 22, 2006, which claims the benefit of U.S. Provisional Application No. 60/750,866, filed Dec. 15, 2005, all of which are hereby incorporated herein by reference.

FIELD OF THE INVENTION

The invention concerns a data storage system, and in particular concerns a parallel data storage system using an array of data storage devices.

BACKGROUND OF THE INVENTION

The demand for data storage capacity is constantly increasing. While the capacities available from data storage devices are also increasing, many applications have data storage requirements that exceed the capacity available from a single data storage device. One storage solution for these applications is a data storage system using an array of data storage devices.

Data storage device arrays increase storage capacity by dividing the data to be stored among the devices in the array. For example, conventional systems typically divide the data by file or sector, with different files or sectors being stored in different devices in the array. While this arrangement results in improved storage capacity, the performance of the array as a whole is typically limited to the level of performance of the individual data storage devices. This limitation exists because conventional systems typically transfer the data one file at a time or one sector at a time to the individual data storage devices, which usually causes the data storage devices not receiving data to sit idle while they wait for data to be transferred to them.

Accordingly, a need exists for an improved parallel data storage system that provides both improvements in data capacity and data storage performance.

SUMMARY OF THE INVENTION

The present invention provides a parallel data storage system for storing data received from a host system using multiple data storage devices. The system includes an interface for communicating with the host system and a buffer configured to store data sectors received from the host system via the interface. A switch is used to selectively connect the interface and the data storage devices to the buffer to facilitate the transfer of data into and out of the buffer. The operation of the parallel data storage system is managed by a controller.

The present invention improves the performance of conventional parallel data storage systems by using an innovative data transfer process. According to one embodiment of the invention, the data sectors stored in the buffer are segmented into multiple data cells of equal size. The data cells are distributed among the data storage devices using a distribution method, where one data cell is transferred to one of the data storage devices during each time slot of the distribution method. Additionally, the data cells are routed to the data storage devices in manner that transfers all data cells segmented from the same data sector to the same data storage device. Once transferred to the data storage devices, the data cells are reassembled into their respective data sectors and the data sectors are stored in the data storage devices.

The segmentation of the data sectors and the distribution of the resulting data cells produces significant performance advantages over conventional parallel data storage systems. By distributing the data cells among the data storage devices one at a time, the parallelism of the processing performed by the data storage devices is increased. This improvement in parallelism allows the array of data storage devices to attain a data transfer rate greater than that available from any of the data storage devices individually. Accordingly, the present invention provides a data storage system capable of increasing storage capacity through the use of multiple storage devices as well as increasing the data transfer rate of the system when compared to the individual data storage devices.

The foregoing summary of the invention has been provided so that the nature of the invention can be understood quickly. A more detailed and complete understanding of the preferred embodiments of the invention can be obtained by reference to the following detailed description of the invention together with the associated drawings.

DETAILED DESCRIPTION OF THE INVENTION

Figure 1:
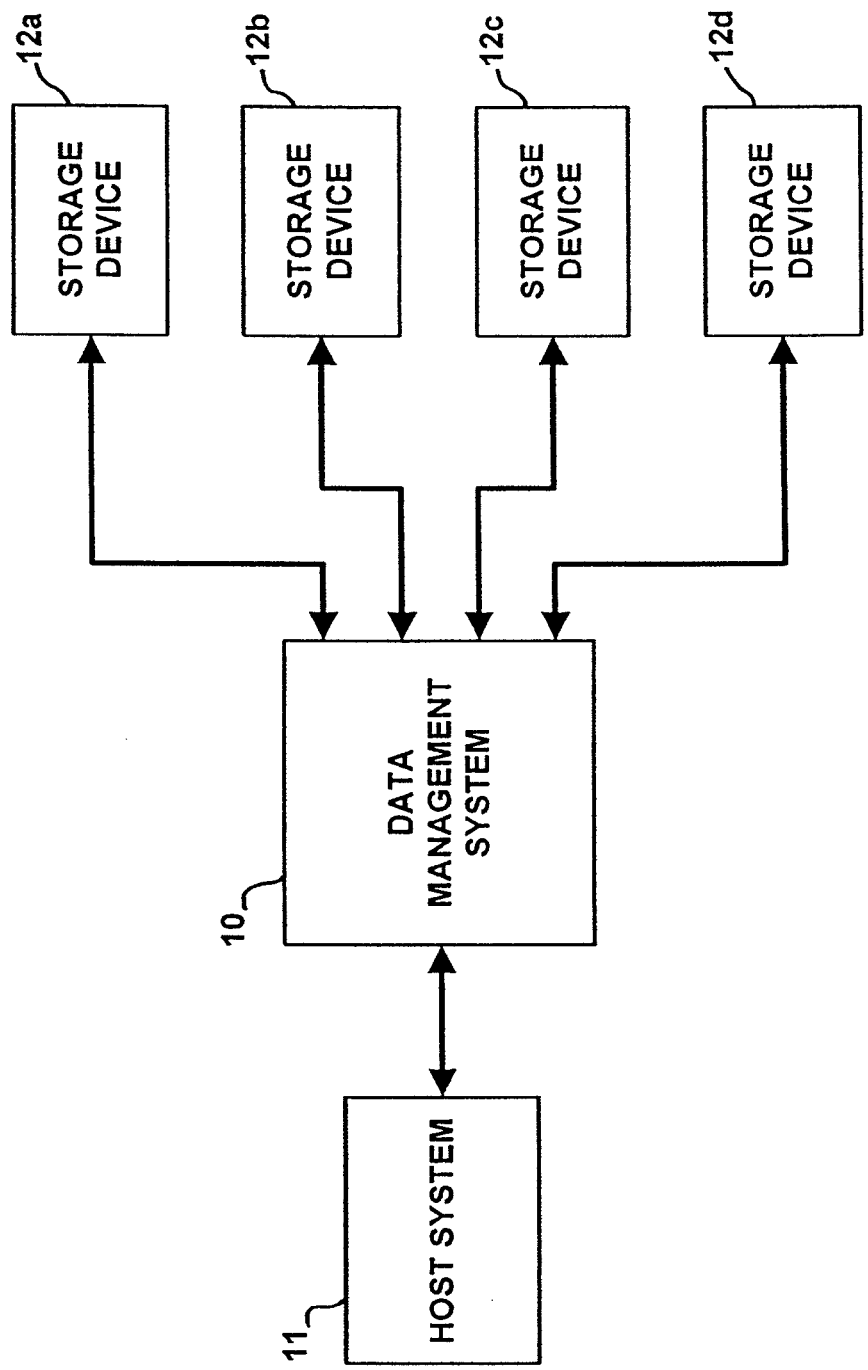
FIG. 1 is a block diagram depicting one embodiment of a parallel data storage system connected to a host system.

FIG. 1 is a block diagram representing a parallel data storage system according to one embodiment of the invention. As shown in FIG. 1, data management system 10 connects host system 11 to storage devices 12a to 12d. As will be described in more detail below, data management system 10 stores data received from host system 11 in storage devices 12a to 12d. Alternatively, data management system 10 retrieves data stored in storage devices 12a to 12d at the request of host system 11 and transfers the requested data to host system 11.

The parallel data storage system, in one embodiment of the invention, includes data management system 10 and storage devices 12a to 12d. FIG. 1 depicts four data storage devices connected to data management system 10. It is to be understood, however, that the invention is not limited to this number of storage devices and can be implemented with more or less than four storage devices. FIG. 1 also depicts data management system 10 and storage devices 12a to 12d as separate components in the overall system. It is to be understood that data management system 10 and storage devices 12a to 12d may be assembled and packaged as a single component or as separate components which are later connected together by the end user of the system.

Storage devices 12a to 12d represent data storage devices capable of reading and writing data from and to a storage medium. In one embodiment of the invention, solid-state devices using flash memory are used for the storage devices.

One skilled in the art will recognize that other types of storage devices such as hard drives and optical media drives can also be used without departing from the scope of the invention. The storage devices may be the same type of device having the same storage capacity. Alternatively, one skilled in the art will recognize that the invention is capable of operating using different types of storage devices as well as storage devices having different amounts of storage capacity.

Host system 11 represents any system or device having a need for data storage and a compatible interface for communicating with the parallel data storage system. For example, host system 11 may be a general purpose computer such as a personal computer (PC) or workstation, or a server. Alternatively, host system 11 may be a camera or recording system for capturing audio and/or video data. As will be described below, the present invention provides a data storage system that is capable of increasing both capacity and performance to meet the ever-increasing data storage needs of a wide variety of systems.

Figure 2:
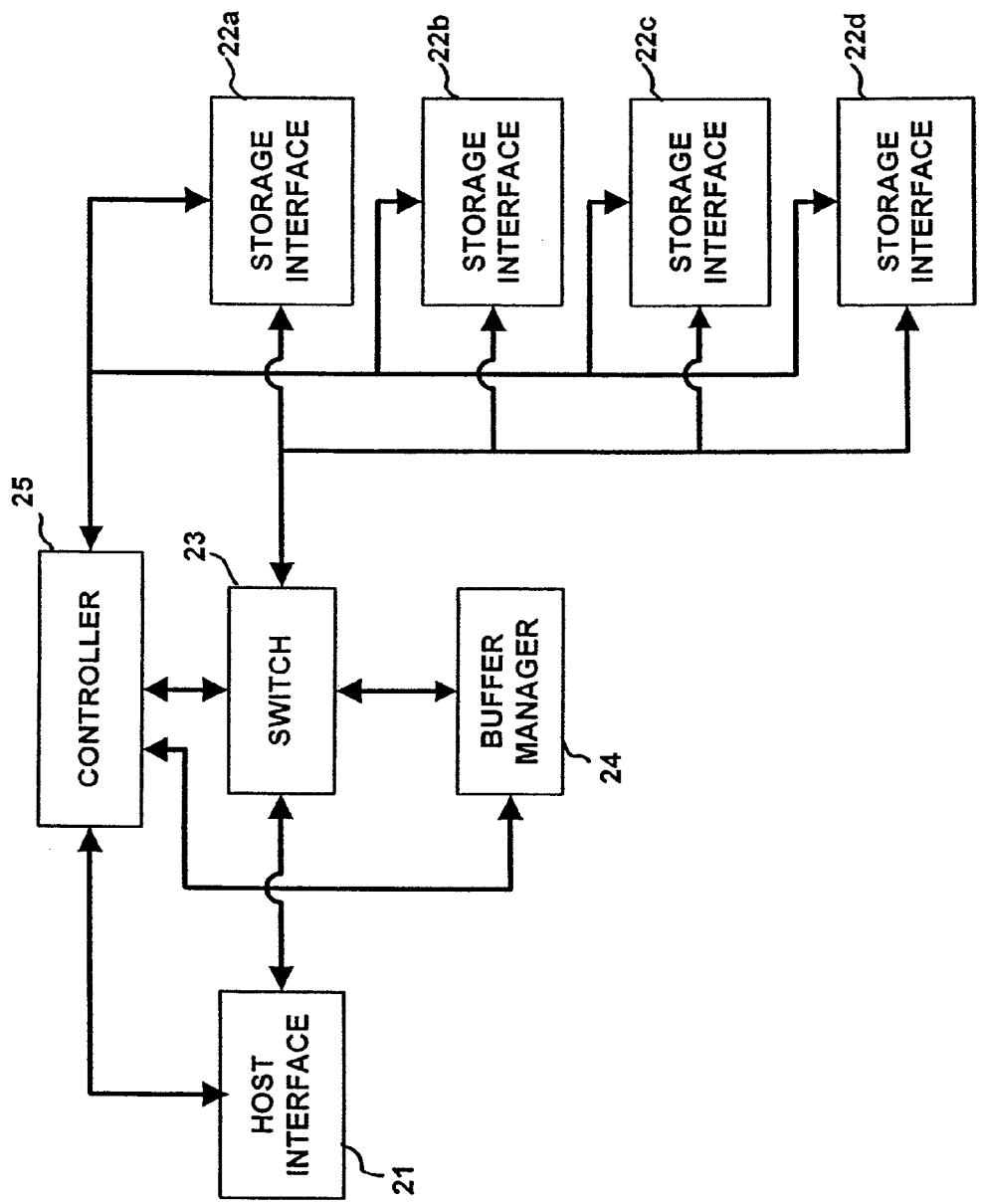
FIG. 2 is a block diagram depicting one embodiment of a data management system used in the present invention to distribute data among storage devices.

FIG. 2 is a block diagram depicting the primary components of data management system 10. As shown in FIG. 2, data management system 10 includes host interface 21, storage interfaces 22a to 22d, switch 23, buffer manager 24 and controller 25. Briefly, host interface 21 facilitates communication between host system 11 and data management system 10. Storage interfaces 22a to 22d facilitate communication between data management system 10 and storage devices 12a to 12d, respectively. Switch 23 selectively connects host interface 21 and storage interfaces 22a to 22d to buffer manager 24, thereby allowing the interfaces to transfer data to and from buffer manager 24. Finally, controller 25 monitors and controls the operation of each of the components within data management system 10.

As mentioned above, host interface 21 facilitates communication between host system 11 and data management system 10. This communication includes the transfer of data as well as command and control information. According to one embodiment of the invention, host interface 21 is an Advanced Technology Attachment (ATA) interface, and specifically is an ATA target device that receives and responds to commands from an ATA host operating in host system 11. The invention is not limited to using any one of the current ATA interface standards and also can use other types of interfaces, such as the Small Computer System Interface (SCSI), which have a fixed size data packet. Host interface 21 may use a physical interface such as CompactFlash or other ATA compatible interfaces. Additionally, a bridge or other conversion device may be used to interconnect host interface 21 and host system 11 through other types of ports such as Universal Serial Bus (USB) and IEEE 1394.

Similar to host interface 21, storage interfaces 22a to 22d facilitate communication between data management system 10 and respective ones of storage devices 12a to 12d. Again, this communication includes the transfer of data as well as command and control information. According to one embodiment of the invention, storage interfaces 22a to 22d are ATA interfaces. Unlike host interface 21, however, storage interfaces 22a to 22d are implemented as ATA host devices rather than ATA target devices. Accordingly, storage interfaces 22a to 22d generate commands which are executed by storage devices 12a to 12d, respectively. As with host interface 21, storage interfaces 22a to 22d are not limited to any one of the current ATA interface standards and can use other types of interfaces, such as SCSI, which have a fixed data packet size. Storage interfaces 22a to 22d may use a physical interface such as CompactFlash or other ATA compatible interfaces. Additionally, a bridge or other conversion device may be used to interconnect storage interfaces 22a to 22d and storage devices 12a to 12d through other types of ports such as Universal Serial Bus (USB) and IEEE 1394. It is further noted that storage interfaces 22a to 22d may use a different type of interface than that used by host interface 21.

Switch 23 is a multiple port bus having host interface 21, storage interfaces 22a to 22d and buffer manager 24 connected to respective ports. Controller 25 controls the operation of switch 23 to selectively connect host interface 21 and storage interfaces 22a to 22d to buffer manager 24. Additional details on the connections between host interface 21, storage interfaces 22a to 22d and buffer manager 24 are provided below.

Figure 2B:
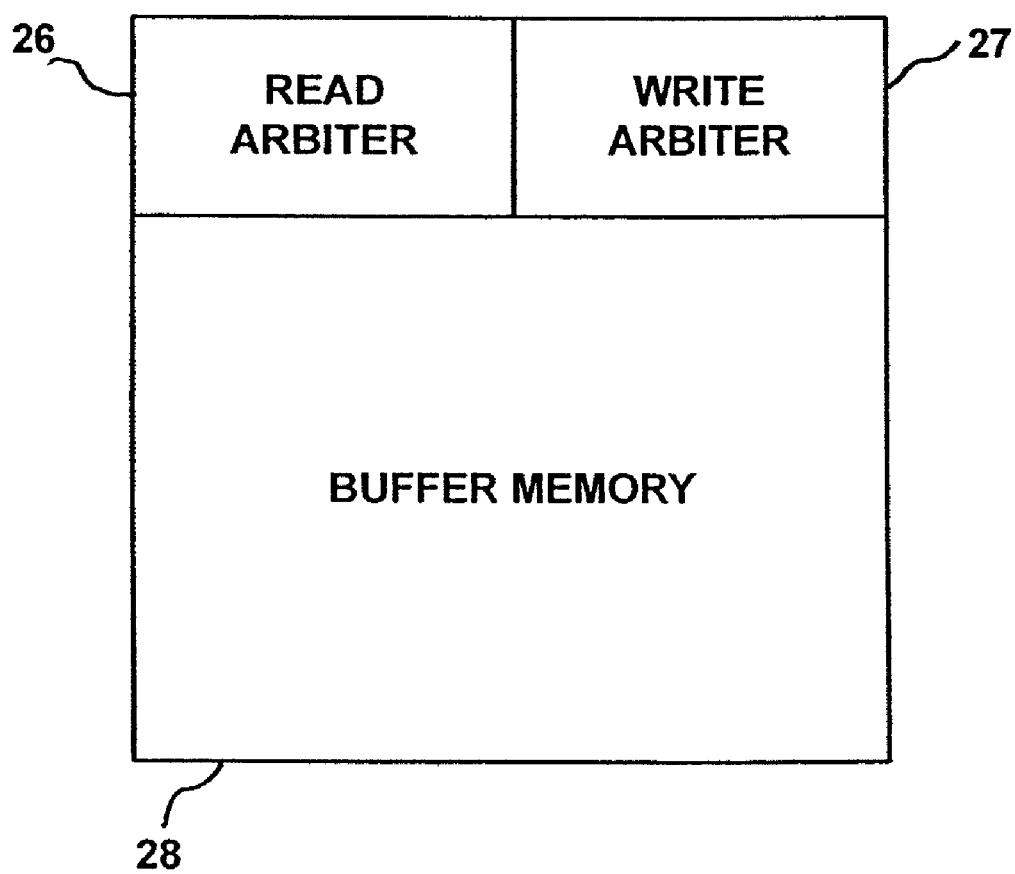
FIG. 2B is a block diagram depicting components of a buffer manager according to one embodiment of the invention.

FIG. 2B is a block diagram depicting the primary components of buffer manager 24. As shown in FIG. 2B, buffer manager 24 includes read arbiter 26, write arbiter 27 and buffer memory 28. In a preferred embodiment, buffer memory 28 is a random access memory, such as Static Random Access Memory (SRAM) and Dynamic Random Access Memory (DRAM), which is used to temporarily store data being transferred between host system 11 and storage devices 12a to 12d. Buffer memory 28 may be a single port memory or a dual port memory. Buffer memory 28 includes sufficient capacity to store a maximum amount of data to be transferred during a single read or write operation. For example, under the ATA standard, 256 sectors of 512 bytes each is the maximum amount of data read or written in response to a single ATA command. In this example, buffer memory 28 would have sufficient capacity to store at least 256 sectors of data.

Read arbiter 26 and write arbiter 27 handle requests for operations to buffer memory 28. Specifically, read arbiter 26 manages requests for read operations for transferring data from buffer memory 28 and write arbiter 27 manages requests for write operations for transferring data to buffer memory 28. In one embodiment of the invention, each of the arbiters is implemented using digital logic and is capable of managing three simultaneous requests, where the requests come from any of controller 25, host interface 21 and storage interfaces 22a to 22d. Priorities for granting access to buffer memory 28 can be varied depending on the design requirements for the system. For example, requests from controller 25 may be given top priority followed by requests from host interface 21 and storage interfaces 22a to 22d. One skilled in the art will recognize that arbiters having different configurations and capacities can be used in alternative embodiments of the invention.

In a preferred embodiment, controller 25 is a microcontroller having a processor and memory and is programmed to execute code for performing the operations of the present invention. In alternative embodiments, controller 25 may comprise a microprocessor together with a finite state machine, or may similarly comprise a call processor. While only a single controller is depicted in FIG. 2, it is to be understood that more than one controller can be incorporated into data management system 10 with various control tasks being distributed between the controllers. The operation of controller 25 will be described further below.

The components of data management system 10 described above may be implemented using individually packaged application specific integrated circuits (ASICs). Alternatively, one or more of the components may be implemented using a programmable gate array. For example, in one embodiment of the invention, host interface 21, storage interfaces 22a to 22d, switch 23 and buffer manager 24 are implemented using a single field programmable gate array (FPGA).

Figure 3:
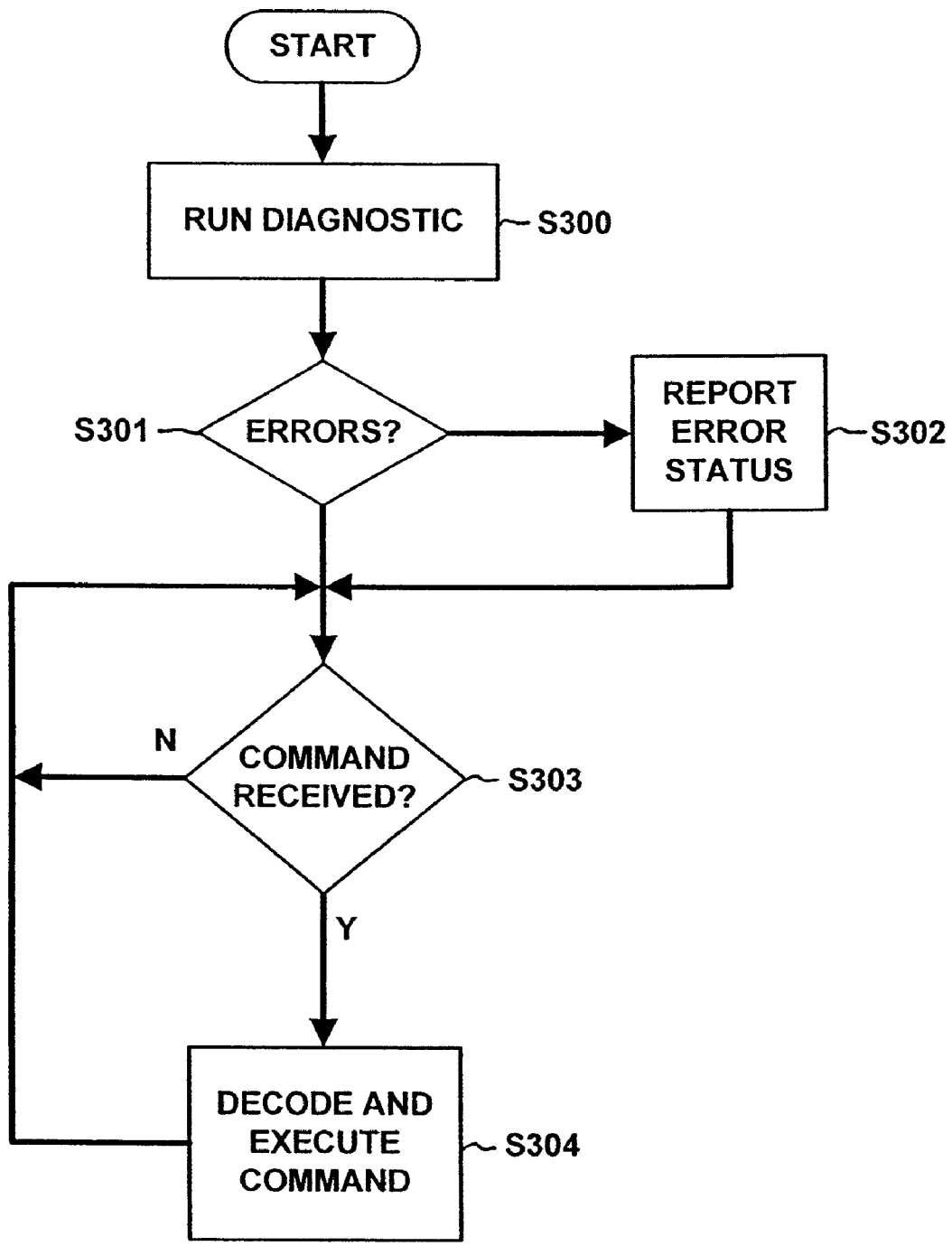
FIG. 3 is a flowchart depicting a general operating process performed by the parallel data storage system.

Turning to FIG. 3, a flowchart is presented which represents the general operating process executed by the parallel data storage system of the present invention. The process is initiated at power up or following a reset of the system. Initially, in step S300, controller 25 initiates a diagnostic test in each of storage devices 12a to 12d. The diagnostic test confirms the operability and determines the current status of the storage device. The type of diagnostic test is dependent upon the type of storage device being used in the system. Diagnostic tests are well known to those skilled in the art and will not be described further herein. During execution of the diagnostic tests, a busy status is indicated in host interface 21 to inform host system 11 that the system is currently unavailable.

In step S301, controller 25 receives the results of the diagnostic tests from each of storage devices 12a to 12d. If an error is returned from any of the storage devices, controller 25 determines the type of error and stores it in an error register. The error is then reported to host system 11 via host interface 21 in step S302. The process then proceeds to step S303 where controller 25 waits for a command from host system 11. If no error is returned from the storage devices and each storage device indicates a ready status, controller 25 posts a ready status to host system 11 via host interface 21 and waits for a command from host system 11 in step S303.

If an error is reported to host system 11, the design of the system provides options for further operations. One option is for host system 11 to send a reset command to controller 25 to attempt to clear any errors by resetting the system. If the error persists, or if the type of error reported to host system 11 is not likely to be cleared through a reset, host system 11 may simply notify a user of the error and shut down data storage operations until the parallel data storage system is fully operational. Alternatively, if one or more of storage devices 12a to 12d return a ready status, controller 25 may report this to host system 11 and perform the data storage operations described below using those storage devices having a ready status.

When host system 11 issues a command to data management system 10, host interface 21 notifies controller 25 that a command has been received. Controller 25 retrieves the command from one or more command registers, decodes the command and executes the necessary processes in step S304. Possible commands include, but are not limited to, a fix data transfer command (e.g., identify drive), a write command, a read command and a purge command. In response to any command either not recognized or simply not supported by the system, controller 25 returns an abort command status to host system 11 via host interface 21.

For fix data transfer commands, controller 25 issues requests for drive information to each of storage devices 12a to 12d via storage interfaces 22a to 22d, respectively. The request format and protocol will vary depending on the type of storage device being used and are well known to those skilled in the art. The returned drive information is then reported to host system 11 via host interface 21. Likewise, in response to a purge command, controller 25 issues a purge instruction to each of storage devices 12a to 12d, via storage interfaces 22a to 22d, respectively. The format and protocol of the purge command will vary depending on the type of storage device being used and are well known to those skilled in the art.

Figure 4:
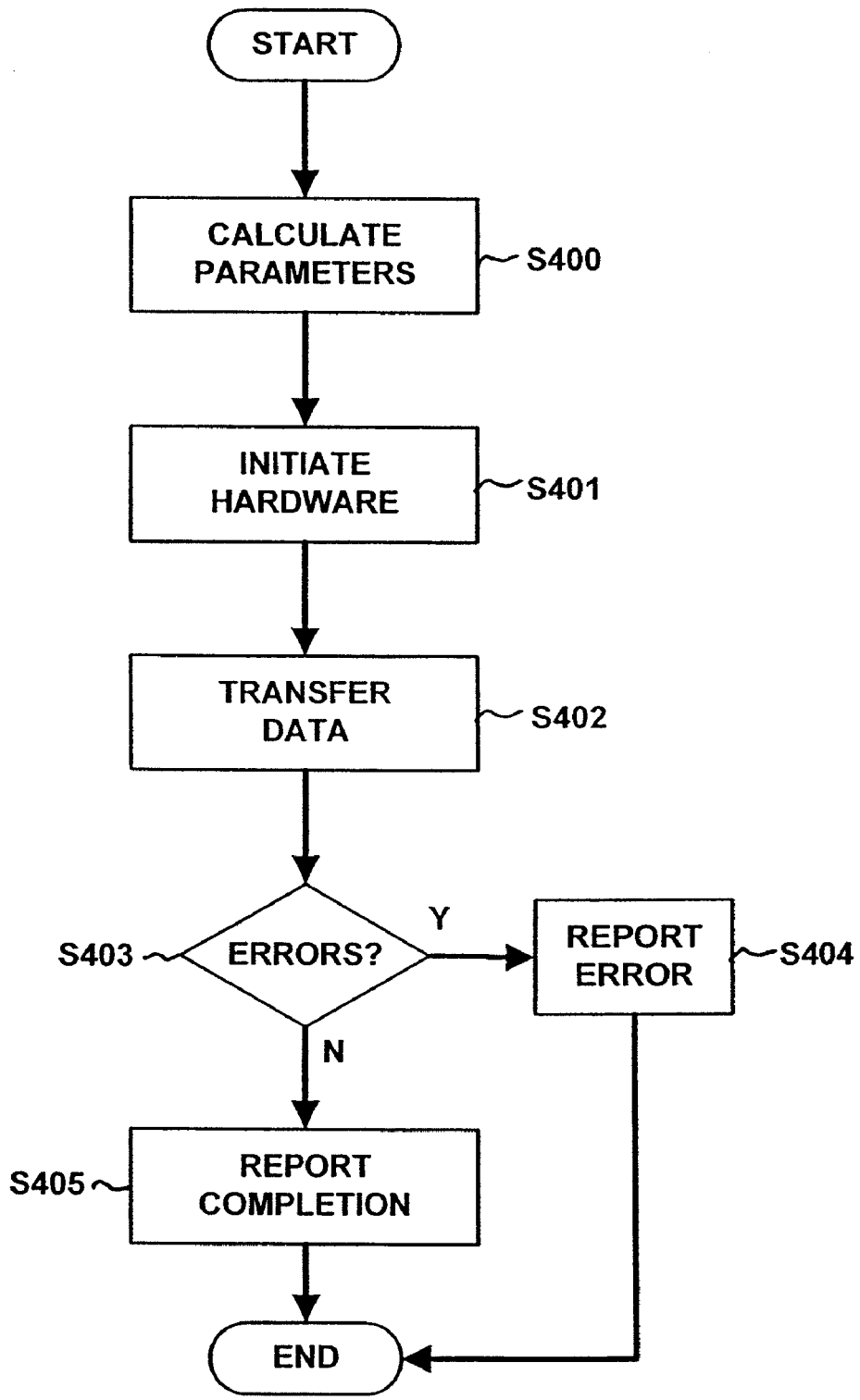
FIG. 4 is a flowchart depicting a data transfer process.

FIG. 4 is a flowchart depicting a process executed by controller 25 to transfer data between host system 11 and storage devices 12a to 12d. This process is performed in response to receiving a read or write command from host system 11. Briefly, the parameters of the data transfer are calculated, the system hardware to be used in the data transfer is initiated, and the data transfer is performed. Upon completion of the data transfer, the transfer is confirmed and either an error report or completion report is provided to the host system via the host interface.

The process in FIG. 4 is initiated upon controller 25 decoding a command received from host system 11 and determining that the command is to read data from storage devices 12a to 12d or to write data to storage devices 12a to 12d. In step S400, controller 25 retrieves the command details from one or more command registers and calculates the parameters of the data transfer. The parameters of the data transfer include the logical block address (LBA) and the block count, or number of sectors, of the data to be transferred. Using these parameters, controller 25 calculates parameters for direct memory access (DMA) transfer of the data between storage devices 12a to 12d and host system 11. For example, each of host interface 21 and storage interfaces 22a to 22d includes a DMA engine used to transfer data between an internal buffer of the respective interface and buffer manager 24. Controller 25 provides each of these DMA engines with data transfer parameters which include addresses, transfer count and transaction size.

In step S401, controller 25 initiates the hardware to be used in the data transfer. This includes providing the respective DMA engines with the transfer parameters mentioned above. In addition, storage devices 12a to 12d are sent commands via storage interfaces 22a to 22d, respectively, to set up for the data transfer. Once the hardware initiation is complete, the data transfer occurs in step S402.

Figure 5:
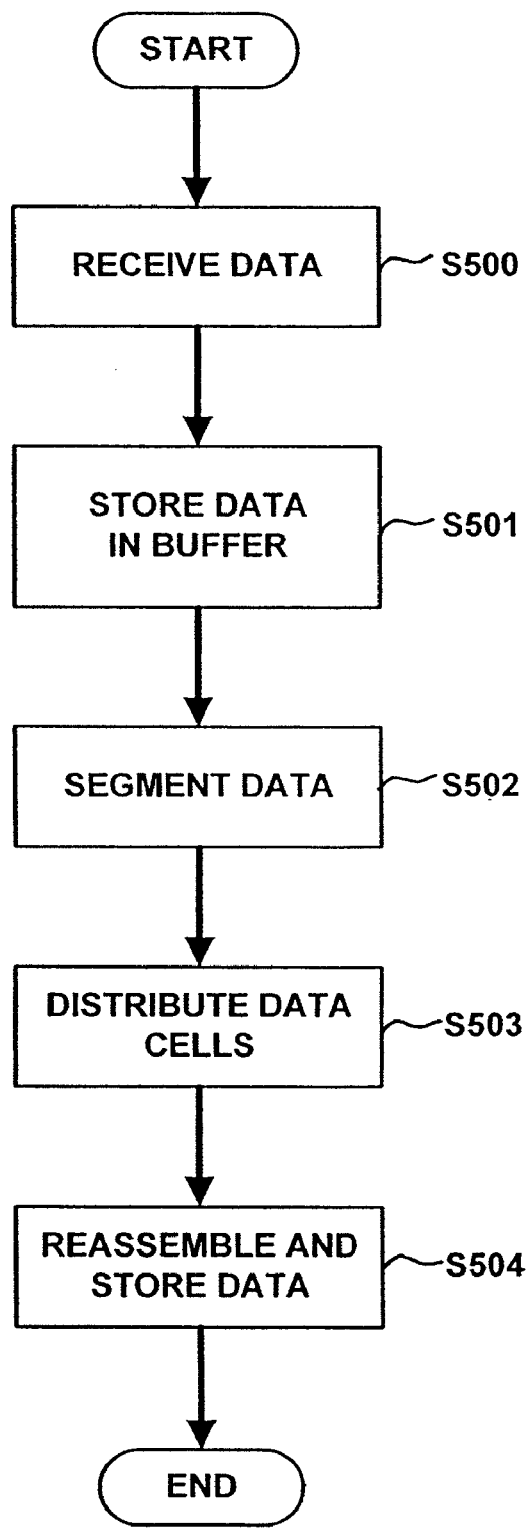
FIG. 5 is a flowchart depicting a data write process.

FIG. 5 is a flowchart depicting a process for transferring data from host system 11 to storage devices 12a to 12d to be stored. Briefly, the data is received by the host interface and stored in the buffer. The data is segmented into data cells and distributed among the storage devices via the respective storage interfaces. The data cells are then reassembled and stored in respective storage devices.

In step S500, data is transferred from host system 11 to host interface 21. As data sectors are received, they are stored in a buffer internal to host interface 21 where they await transfer to buffer manager 24 by the DMA engine of host interface 21. In step S501, the DMA engine of host interface 21 transfers the data sectors to buffer manager 24. As mentioned above, buffer memory 28 in buffer manager 24 can be either a single port memory or a dual port memory. If buffer manager 24 is implemented using a dual port memory, host interface 21 can be connected directly to one of the ports so that the DMA engine of host interface 21 can write the data sectors into buffer manager 24 without having to go through switch 23. Controller 25 may also be configured to have direct access to buffer manager 24 without having to go through switch 23. If a single port memory is used, the DMA engine of host interface 21 transfers the data sectors to buffer manager 24 via switch 23.

In the arrangement shown in FIG. 2, where host interface 21 is connected with buffer manager 24 via switch 23, access to buffer manager 24 is granted using an arbitration method. Specifically, switch 23 is controlled by controller 25 to selectively connect host interface 21 and storage interfaces 22a to 22d to buffer manager 24 by alternating between host interface 21 and one of storage interfaces 22a to 22d based on the particular arbitration method being used. Possible arbitration methods include, but are not limited to, round-robin, fixed priority, dynamic priority, and the like. The arbitration of access by the individual storage interfaces is described in more detail below. During each time slot of the arbitration method, the DMA engine of host interface 21 transfers a portion of the data sectors to buffer manager 24. By alternating access to buffer manager 24, the subsequent transfer of data to storage devices 12a to 12d can begin prior to receiving all of the data from host system 11.

Figure 6A:
FIGS. 6A to 6C are diagrams representing the segmentation of data sectors according to one embodiment.
Figure 6B:
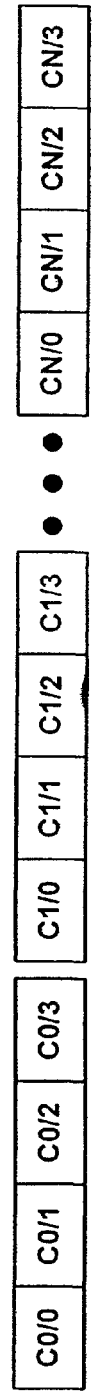

In steps S502 and S503, the data sectors stored in buffer manager 24 are segmented and distributed among storage interfaces 22a to 22d to be subsequently stored in storage devices 12a to 12d, respectively. Specifically, each data sector is segmented into smaller data cells of equal size, which are then individually transferred by storage interfaces 22a to 22d by the DMA engines internal to each storage interface. Segmentation of the data sectors is performed by the DMA engines transferring an amount of data equal to one data cell during each DMA transaction. The data cell size is therefore set by the transfer parameters provided by controller 25. FIGS. 6A and 6B depict a representation of the relationship between the data sectors and the data cells. N data sectors are represented in FIG. 6A. N represents the number of data sectors being transferred in a single write command from host system 11, and is determined from the command information retrieved by controller 25. As mentioned above, in an embodiment using the ATA standard, no more than 256 data sectors are transferred in a single data write action.

FIG. 6B is a representation of the data cells segmented from the data sectors depicted in FIG. 6A. In this example, each data sector is segmented into four data cells. Specifically, data sector 0 is segmented into data cells C0/0, C0/1, C0/2 and C0/3, data sector 1 is segmented into data cells C1/0, C1/1, C1/2 and C1/3, and data sector N is segmented into data cells CN/0, CN/1, CN/2 and CN/3. Segmentation of each data sector into four data cells represents only one example of the number of data cells segmented from each data sector. Data sectors can and typically are segmented into a different number of data cells without departing from the scope of the invention.

The optimal number of data cells segmented from each data sector, and hence the preferred size of the individual data cells, is influenced by several factors. For example, the internal data bus bandwidth sets one performance limit. The internal data bus bandwidth (P) is the sum of the effective bandwidth (E), the overhead bandwidth (O) and the idle bandwidth (I). As data cell size is reduced, system overhead increases due to the increase in switching and in the number of data transfer transactions that must be completed. As overhead increases, the effective bandwidth of the system decreases thereby reducing system performance.

Another factor that influences the preferred data cell size is the capacity of the internal buffers of the interfaces (typically FIFOs). As the data cell size increases, the internal buffers are required to store more data prior to transferring the data. Larger buffers require larger logic circuits in the actual interface devices, which may not be acceptable in view of other design constraints faced by the designers.

Yet another factor is the back end bandwidth available from the array of data storage devices. The back end bandwidth is derived from a combination of the number of data storage devices used in the system and the individual bandwidth of the data storage devices. Once the effective bandwidth (E) of the system reaches the back end bandwidth of the data storage devices, increasing the data cell size will not result in additional performance improvements.

A series of simulations have been run to evaluate different data cell sizes for a sample system. The sample system included eight data storage devices and an internal data bus bandwidth (P) of 66 MHz×4 for 264 MB/s. Using this sample system, a 4 byte data cell size resulted in overhead and idle bandwidth equal to 239 MB/s and an effective bandwidth of 25 MB/s; an 8 byte data cell size resulted in overhead and idle bandwidth of 224 MB/s and an effective bandwidth of 40 MB/s; a 16 byte data cell size resulted in overhead and idle bandwidth of 222 MB/s and an effective bandwidth of 42 MB/s; and a 24 byte data cell size resulted in overhead and idle bandwidth of 222 MB/s and an effective bandwidth of 42 MB/s. As shown above, in the sample system a data cell size of 16 bytes (32 data cells per data sector) produced the best system performance without using a data cell size, such as 24 bytes, that would require enlarging the internal interface buffers.

In step S503, the data cells are distributed among storage interfaces 22a to 22d using an arbitrated distribution method. This method may include a round-robin method, a fixed priority method, a dynamic priority method, etc. Using a round-robin arbitration method, one data cell is transferred to one storage interface by the DMA engine internal to that storage interface during each time slot of the method. Using the round-robin distribution method, each storage interface receives one data cell during each round of the method. For example, storage interface 22a receives a first data cell, storage interface 22b receives a second data cell, storage interface 22c receives a third data cell, and storage interface 22d receives a fourth data cell. The process is then repeated until the data cells from all of the data sectors being transferred from host system 11 have been transferred to storage interfaces 22a to 22d.

Figure 6C:
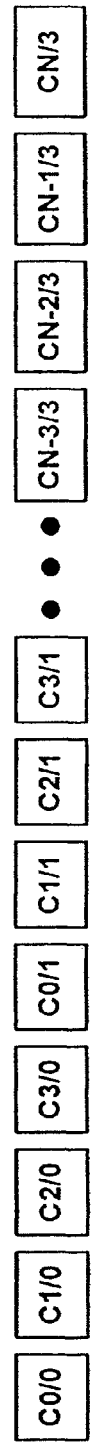

The data cells are routed to particular storage interfaces using a static routing algorithm controlled by controller 25. In this manner, the data cells from each data sector are all sent to the same storage interface for storage in a respective storage device. For example, all of the data cells from sector 0 are sent to storage interface 22a, all of the data cells for sector 1 are sent to storage interface 22b, all of the data cells for sector 2 are sent to storage interface 22c and all of the data cells for sector 3 are sent to storage interface 22d. This process is repeated to distribute the data cells among storage interfaces 22a to 22d. The order of transferring data cells according to the example described above is represented by the depiction in FIG. 6C.

As mentioned above, access to buffer manager 24 may be allocated between host interface 21 and storage interfaces 22a to 22d using an arbitration method. In this manner, switch 23 is controlled to alternate access to buffer manager 24 between host interface 21 and storage interfaces 22a to 22d, whose access to switch 23 is also controlled by an arbitration method as discussed above. For example, using a round-robin method, switch 23 is controlled to allow host interface 21 to transfer one data cell to buffer manager 24, followed by storage interface 22a transferring one data cell out of buffer manager 24, followed by host interface transferring another data cell to buffer manager 24, then storage interface 22b transferring a data cell out of buffer manager 24. This allocation process is repeated to allow each of the storage interfaces access to buffer manager 24 with alternating access being granted to host interface 21.

The distribution process of step S503 may promptly begin as soon as data is available in buffer manager 24. Alternatively, the distribution process may wait until a minimum number of data sectors have been transferred and stored in buffer manager 24 before starting. According to one embodiment, the distribution process begins once the number of data sectors stored in buffer manager 24 is sufficient to allow the transfer of data cells to begin for each of the storage interfaces being used. The splitting of access to buffer manager 24 between host interface 21 and storage interfaces 22a to 22d allows the distribution of data cells to occur while the transfer of data into buffer manager 24 continues until all data sectors have been received from host system 11.

During the data distribution process, controller 25 monitors each of the buffers internal to storage interfaces 22a to 22d to prevent overflow. In the event that one of the storage interfaces has no capacity for receiving additional data cells, controller 25 stops the transfer of data cells to the storage interfaces until the buffer has recovered. During this time data transfers from host interface 21 into buffer manager 24 can continue. In addition, controller 25 used a buffer register to monitor and control the flow of data into buffer manager 24. The buffer register includes one or more registers and a finite state machine. The buffer register is updated by controller 25 to reflect the status of buffer manager 24. The status information includes full/empty status, capacity used, capacity remaining, etc. The buffer register may be part of controller 25, buffer manager 24, or implemented as a separate component connected to controller 25.

In step S504, the data cells received by the respective storage interfaces 22a to 22d are reassembled into their original data sectors and are sent to storage devices 12a to 12d, respectively, to be stored. Because the data sectors are transferred one data cell at a time to each of the storage interfaces, this reassembly and storage processing occurs in parallel thereby providing improvements to overall storage performance. These advantages become significant when the data transfer rates of storage interfaces 22a to 22d and storage devices 12a to 12d are slower than the data transfer rate between host system 11 and host interface 21. For example, solid-state storage devices using flash memory typically have a data transfer rate slower than conventional hard drive interfaces. By using the system of the present invention, an array of solid-state data storage devices can be used as storage devices 12a to 12d to provide a cumulative data transfer rate comparable to a typical hard disk drive.

Improvements in the overall data transfer rate of the parallel data storage system require the individual components of the system to have adequate data transfer rates. For example, in the above-described embodiment in which switch 23 allocates access to buffer manager 24 only between host interface 21 and storage interfaces 22a to 22d, switch 23 must have a data transfer rate at least twice as fast as the fastest of the interfaces. This allows the data transfer through the system to be maintained without the back end data transfer to the storage devices having to wait for data transfers on the front end from the host system.

Once the data transfer has been completed, processing returns to step S403 in FIG. 4 where it is determined if an error occurred during the data transfer. If an error occurred in any of the storage devices, controller 25 reports the error to host system 11 in step S404. If no error occurred in any of the storage devices, controller 25 reports the completion of the data write command in step S405.

Figure 7:
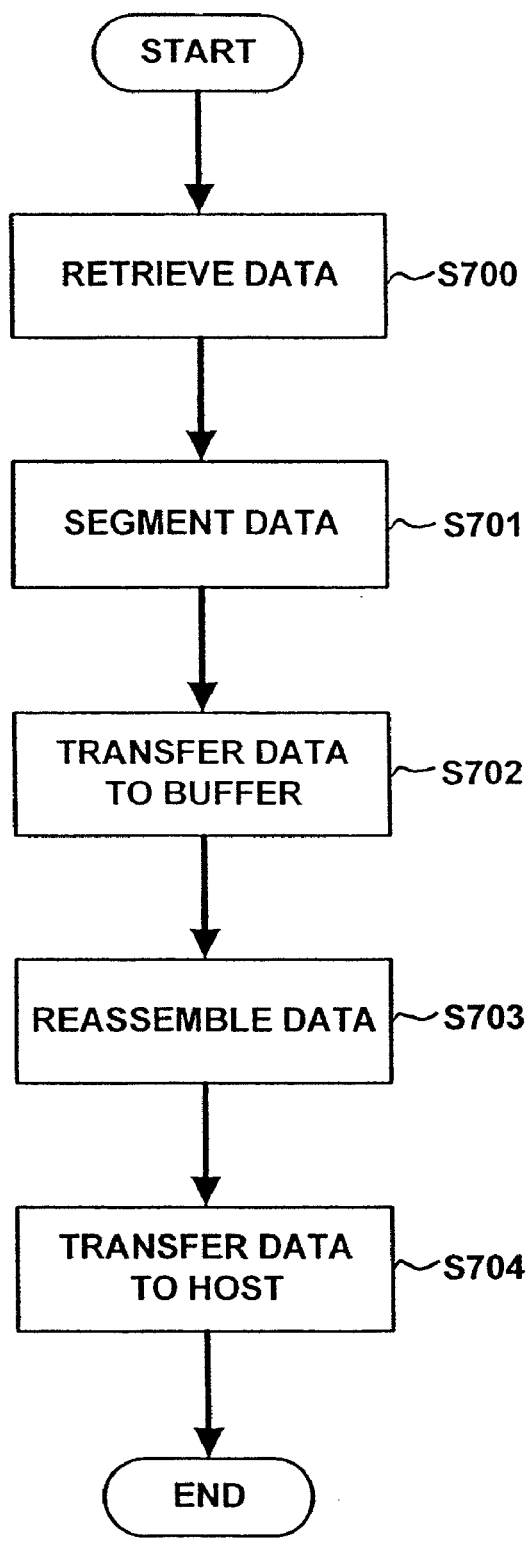
FIG. 7 is a flowchart depicting a data read process.

FIG. 7 is a flowchart depicting the process of transferring data from storage devices 12a to 12d in the event of receiving a read command from host system 11. Briefly, the data sectors are requested from storage devices 12a to 12d and transferred to storage interfaces 22a to 22d. The data sectors are then segmented into data cells and transferred to buffer manager 24 using a round-robin allocation method. The original data sectors are reassembled in buffer manager 24 and transferred to host system 11 via host interface 21.

In step S700, the data sectors requested by host system 11 are requested from storage devices 12a to 12d via storage interfaces 22a to 22d, respectively. As the data sectors are retrieved, they are segmented and transferred one data cell at a time to buffer manager 24 in steps S701 and S702 by the DMA engines internal to each of storage interfaces 22a to 22d using transfer parameters provided by controller 25. Similar to the process described above with respect to FIG. 5, access to buffer manager 24 is controller via switch 23 using an arbitration method executed by controller 25. In this manner, storage interfaces 22a to 22d are given alternating access to buffer manager 24 to transfer data cells according to the arbitration method used.

In step S703, the data sectors are reassembled from the data cells transferred from the data storage devices. The data sectors are reassembled by storing data cells from respective data sectors together as they are transferred into buffer manager 24. Once the requested data is stored in buffer manager 24, the internal DMA engine of host interface 21 transfers the data to host system 11 in step S704 using transfer parameters provided by controller 25. Access to buffer manager 24 by host interface 21 and storage interfaces 22a to 22d is allocated by controller 25 and switch 23 using an arbitration method, such as those described above. As with the data storage process of FIG. 5, the transfer of data by host interface 21 may begin immediately upon buffer manager 24 receiving the first data cell from one of the storage interfaces. Alternatively, the transfer may wait to being until a minimum amount of data has been transferred to buffer manager 24. In addition, access to buffer manager 24 may be arbitrated to alternate between host interface 21 and storage interfaces 22a to 22d.

The foregoing description of the invention illustrates and describes the preferred embodiments of the present invention. However, it is to be understood that the invention is capable of use in various other combinations and modifications within the scope of the inventive concepts as expressed herein, commensurate with the above teachings, and/or the skill or knowledge of the relevant art. The embodiments described hereinabove are further intended to explain the best modes known of practicing the invention and to enable others skilled in the art to utilize the invention in such, or other, embodiments and with the various modifications required by the particular applications or uses of the invention. Accordingly, the description is not intended to limit the scope of the invention, which should be interpreted using the appended claims.

What is claimed is:

1. A method for storing data in an array of data storage devices, the method comprising the steps of:
   determining a status of each of a plurality of data storage devices;
   receiving a plurality of data units from a host system;
   distributing the plurality of data units among data storage devices of the plurality of data storage devices determined to have a ready status; and
   storing the plurality of data units in the respective data storage devices.

2. The method according to claim 1, wherein determining a status of the plurality of data storage devices comprises the steps of:
   initiating a diagnostic test in each of the plurality of data storage devices; and
   receiving diagnostic test results from the plurality of data storage devices.

3. The method according to claim 2, further comprising the step of reporting the diagnostic test results to the host system.

4. The method according to claim 3, wherein if the diagnostic test results of one of the plurality of data storage devices is an error, the method further comprises the step of resetting the plurality of data storage devices.

5. The method according to claim 1, wherein distributing the plurality of data units comprises the steps of:
   segmenting the data units into a plurality of data cells; and distributing the data cells among a plurality of storage interfaces in communication with respective ones of the plurality of data storage devices having a ready status.

6. The method according to claim 5, wherein all of the data cells segmented from the same data unit are distributed to the same storage interface.

7. The method according to claim 5, wherein storing the plurality of data units comprises the steps of:
reassembling the data cells into their respective data units; and
transferring the reassembled data cells from the plurality of storage interfaces to the respective ones of the plurality of data storage devices having a ready status.

8. The method according to claim 5, wherein receiving the plurality of data units from the host system comprises the steps of:
transferring the plurality of data units from the host system to a host interface; and
transferring the plurality of data units from the host interface to a buffer.

9. The method according to claim 8, wherein distributing the data cells among the plurality of storage interfaces comprises the step of transferring the data cells from the buffer to the respective storage interfaces, wherein access to the buffer is allocated using an arbitration method.

10. The method according to claim 9, wherein the data cells are distributed among the plurality of storage interfaces using a routing algorithm.

11. A data management system, comprising:
a host interface configured to communicate with a host system;
a buffer configured to store data;
a plurality of storage interfaces configured to communicate with respective ones of a plurality of data storage devices; and
a controller configured to determine a status of each of the plurality of data storage devices, transfer data units received from a host system from the host interface to the buffer, and distribute the data units among data storage devices of the plurality of data storage devices determined to have a ready status for storing the plurality of data units in the respective data storage devices.

12. The data management system according to claim 11, wherein the controller is configured to determine the status of each of the plurality of data storage devices by initiating a diagnostic test in each of the plurality of data storage devices and receiving diagnostic test results from the plurality of data storage devices.

13. The data management system according to claim 12, wherein the controller is further configured to report the diagnostic test results to the host system.

14. The data management system according to claim 12, wherein if the diagnostic test results of one of the plurality of data storage devices is an error, the controller is further configured to reset the plurality of data storage devices.

15. The data management system according to claim 11, wherein the controller is further configured to segment the plurality of data units stored in the buffer into a plurality of data cells and to distribute the data cells among storage interfaces of the plurality of storage interfaces in communication with respective ones of the plurality of data storage devices determined to have a ready status.

16. The data management system according to claim 15, wherein all of the data cells segmented from the same data unit are distributed to the same storage interface.

17. The data management system according to claim 16, wherein the plurality of storage interfaces are configured to reassemble the data cells into their respective data units and to transfer the reassembled data units to the respective ones of the plurality of data storage devices.

18. The data management system according to claim 15, further comprising a switch configured to selectively connect the host interface and the plurality of storage interfaces to the buffer.

19. The data management system according to claim 18, wherein the controller is further configured to allocate access to the buffer by the storage interfaces in communication with respective ones of the plurality of data storage devices determined to have a ready status using an arbitration method.

20. The data management system according to claim 15, wherein the controller is configured to distribute the plurality of data cells among the storage interfaces using a routing algorithm.

* * * * *